United States Patent Office 3,047,494
Patented July 31, 1962

---

3,047,494
METHOD OF CONTROLLING THE EXTRA PRESSURE LUBRICATION OF DRILLING MUDS
William C. Browning, Houston, Tex., assignor to Milwhite Mud Sales Company, St. Louis, Mo., a corporation of Delaware
No Drawing. Filed Apr. 16, 1959, Ser. No. 806,787
32 Claims. (Cl. 252—8.5)

This invention relates to improvements in drilling fluid compositions of the type used in oil well drilling and in particular it pertains to drilling fluids having improved lubricating properties through the incorporation of extreme pressure lubricating agents hereinafter referred to as E.P. agents.

It is becoming increasingly apparent that for the economic production of oil from offshore locations as well as in deep drillings, such as is occasioned in the gulf coast area and elsewhere, positive effort must be made to lower drilling costs. One of the most significant steps in this direction is to provide a drilling fluid that permits an increased amount of rig time devoted to the actual operation of drilling. A substantial portion of the total time consumed during well drilling operations is taken up in the replacement of drill bits and, as wells are being drilled to ever increasing depths, the economic losses attendant upon the increasing amount of time lost in making bit changes cannot be ignored. Frictional forces in the hole as a result of drilling through offsets or dog legs, as well as the particular kind of friction exemplified by the phenomenon known as "differential sticking" may result in excessively costly delays or interruptions in the drilling operations because of stuck pipe.

Thus, perhaps the most important factor tending to improve the economics of oil well drilling in offshore or deep hole conditions is the provision of a drilling fluid with adequate lubricating properties suitable for these conditions.

Approaches have previously been made in this area to provide suitable lubricants for oil well drilling fluids. Previous efforts to provide lubrication to drilling fluids has included oil-in-water emulsions containing a water insoluble oil-soluble sulfurized organic compound in the oil phase wherein the sulfurized organic compound is selected from the class consisting of sulfurized unsaturated higher fatty acids and their esters. Sulfurized open chain olefins and polymers thereof, sulfurized higher-molecular weight paraffinic hydrocarbons, sulfurized crude petroleum and residual fractions thereof, sulfurized terpenes, and sulfurized phenols and salts thereof can be used.

It also has been recommended that drilling muds of enhanced lubricating properties may be obtained by preparing an oil-in-water emulsion consisting of asphalt in the oil phase, said asphalt having chemically combined sulfur in a amount of at least one percent (1%) by weight.

It has also been recommended that a drilling mud of enhanced lubricating properties may be obtained by preparing an oil-in-water emulsion containing clay solids and oil phase of from 2 to 40% by volume of said mud and a water-insoluble preferentially oil wettable inorganic sulfide selected from the group consisting of sulfides of arsenic, antimony, bismuth, lead, zinc, iron, cadmium, copper, molybdenum and mercury.

Inasmuch as the previously recommended drilling muds are oil-in-water emulsion fluids, any of the numerous emulsifying agents known to the art have been recommended for this purpose. It has been especially recommended, however, that the mud filtrate have a low surface tension. Among the suitable emulsifying agents considered have been the sodium soaps of tall oil, the fatty acid ester of the anhydroalkitols. For example, sorbitan, mono di or tri-oleate sorbitan, mono stearate and nonionic agents such as the polyoxyethylated derivatives of phenols, etc., have been mentioned. Of the above emulsifying agents the sodium salt of mahogany acid has been generally preferred.

Deep hole drilling on the gulf coast at the present time necessitates muds containing from 600 p.p.m. to 2000 p.p.m. of calcium ion with treatments of sodium hydroxide of from ½ to 2 pounds per barrel of mud (42 U.S. gallons). Also required are mud densities up to 18–20 pounds per gallon, diesel oil contents of zero to 15% by volume and thermal stability to upwards of 300° F.

It has been recognized in the prior art that the status of the prior art did not satisfactorily solve the problem of effectively providing E.P. lubrications for muds used under gulf coast drilling conditions. In particular, the E.P. lubricating muds prepared according to previously indicated formulations have not proved satisfactory for the more difficult and costly offshore or deep hole drilling conditions. It is precisely to these drilling conditions that my invention relates.

Some existing materials such as sulfurized fatty acid compounds, esters, and the like, may be used to provide E.P. properties in essentially fresh water muds. These materials, however, lose their effectiveness when the pH exceeds 10.5 or thereabouts, will tolerate only about 10% oil, and begin to give erratic results when the calcium ion content of the mud filtrate exceeds about 80 p.p.m.

In studying the E. P. problem relative to offshore and gulf coast drilling conditions, I have discovered means whereby such muds may be provided with E.P. lubrication. The conditions through which this is accomplished are considerably at variance with the teachings of the prior art and in a number of instances diametrically opposed to the teachings of the prior art and represent a novel approach to securing and maintaining E.P. effects under the very rigorous requirements of deep hole drilling conditions.

In my laboratory investigations, based upon the teachings of the prior art, it became apparent that for any E.P. additive to function effectively in any drilling mud, the additive must be present in the mud as a water insoluble colloidal or near colloidal dispersion. Failure to provide E.P. lubrication protection occurred whenever an E.P. product of known effectiveness flocculated, coalesced or otherwise lost its stable dispersion characteristics. Therefore, a well stabilized dispersion appeared to be a prime requisite of an E.P. mud additive formulation.

Examination of the Timken test blocks used in the Timken lubricant tester, or in the Baroid E.P. tester, with a Leitz Ultra-Pac microscope showed that a microscopically thin film of grease-like material formed in the scar area of the test block during testing. If the E.P. additive was oil soluble and the metal surface oil wet, then addition of diesel oil to the test mud would dilute the lubricant layer, and if sufficient oil were added to the mud a test failure would occur. Inasmuch as the E.P. lubricant effect occurs at the point of metal-to-metal contact on a Timken or Baroid E.P. tester the dilution of the E.P. compound with diesel oil would necessarily lessen the E.P. effect. Therefore, lack of oil solubility in my invention is a desirable attribute for the E.P. additive. In fact, as diesel oil has been demonstrated not to provide bit lubrication, surface active agents are to be avoided that would act to increase the wetting of the metal surface by the oil. Inasmuch as the extreme pressure lubricant appears to form at the point of metal-to-metal contact as a result of some chemical reaction, and since in aqueous drilling muds we are concerned with an aqueous dispersion media, it is far more desirable, as in my invention, to provide as the E.P. additive as a stable, near colloidal, dispersion of an oil insoluble material in water.

Other laboratory work showed that oil insolubility of the E.P. additive was in fact a very important factor in preparing the E.P. additives for gulf coast drilling conditions. Such oil insoluble additives were found to include the metal soaps of fatty acids other than the alkali metal soaps, said fatty acids comprising saturated monocarboxylic acid compounds ranging from caproic acid ($C_5H_{11}$.COOH) to melissic acid ($C_{29}H_{59}$.COOH) and mixtures of such acids to adjust the melting or softening range of their metal soap compounds.

Insoluble metal soap compounds of unsaturated monocarboxylic fatty acids comprising myristolic

$$(C_{13}H_{25}.COOH)$$

oleic ($C_{17}H_{33}$.COOH) and ricinoleic ($C_{17}H_{32}$.OH.COOH) and mixtures of saturated and unsaturated monocarboxylic fatty acids were found to be effective. In general, reaction products of castor oil, coconut oil, cottonseed oil, rice oil, soybean oil, lard oil, lower molecular weight resin acids, tall oils and the like with alkaline earth metals, aluminum or metals of the group IV and group VIII elements give satisfactory compounds.

I have found that the aluminum stearates are quite effective as E.P. agents and that effectiveness increased as the fatty acids complex content increased. The so-called tristearates are particularly effective. It should be noted that the oil solubility or gelling characteristics of the aluminum stearates decrease as the fatty acid content increases.

It is a point of novelty in my invention that the formation of conventional greases by formation of an aluminum stearate gel does not give the E.P. lubrication desired. The approach in my invention is the opposite to that conventionally followed in the use of fatty acid compounds in lubrication and grease formulation in that I directly seek to avoid the formation of any of the usual gellatin characteristics associated with conventional grease formulation. I desire a fatty acid compound of minimum solubility in oil as well as in water.

My further investigations showed that low surface tension of the filtrate was not essential to extreme pressure lubrication for the most effective dispersants or emulsifiers found were the lignosulfonates, lignites or certain wood bark extracts, which are agents that characteristically give strong interfacial films but poor surface or interfacial film reduction at air-liquid or liquid-liquid interfaces. These agents are characteristically highly water soluble and oil insoluble. These organic agents do, however, promote water wetting of mineral and metal surfaces. My investigations have shown, however, that conventional wetting agents such as the ethylene oxide derivatives of nonyl-phenol which promote oil wetting of metal surfaces, and are widely suggested as emulsifiers in the prior art, actually impair the action of an E.P. lubrication additive, particularly the oil insoluble types discussed above.

My investigations have shown also that the presence of oil is not essential to the securing of E.P. lubrication effects inasmuch as extremely effective E.P. lubrications may be secured in the absence of any oil in the drilling fluid. If, however, an oil emulsion is used, the E.P. effects of such a mud will be considerably enhanced if the emulsion is formed and stabilized by interfacial film formers such as the lignosulfonates or organic agents that do not drastically lower surface tension. Impairment of action will occur if the emulsions are formed by high drop number, low surface tension type emulsifiers.

My investigations have also shown that the chemical composition of the filtrate media is quite important in the securing of proper extreme pressure lubrication. Consequently, composition of the drilling muds should be specifically designed to secure the maximum E.P. lubrication protection. To maximize E.P. action a high concentration of calcium ion (600 p.p.m. or more) should be maintained to insure insolubility of the E.P. agents such as calcium or heavy metal stearates or tallates. Insolubility of the soap-type compounds, even as their sodium salts, may alternatively be secured if the drilling fluid filtrate has a high enough sodium chloride content (15% or more) to achieve "salting-out" conditions for the sodium tallate or other soap-type compound being used to obtain E.P. lubrication.

Accordingly, it is a primary object of this invention to provide an extreme pressure lubricant in which the extreme pressure agent is dispersed in water.

Another object of this invention is to provide an extreme pressure lubricant for use in drilling muds, and the like, in which an extreme pressure agent is dispersed in water with the addition of a stabilizing agent, which is an organic water soluble hydrophilic polyelectrolyte material.

Yet another object of this invention is to provide an extreme pressure lubricant for drilling muds comprising a water insoluble soap dispersed in water by means of an organic polyelectrolyte capable of multilayer adsorption of the surface of the soap thereby converting the normally hydrophilic surface of the soap into a hydrophilic surface.

Still another object of this invention is to provide an extreme pressure lubricant for drilling muds comprising water insoluble soaps dispersed in water and in which the soaps are metal salts of fatty acids and the metals are the alkaline earth metals, aluminum, or the group four and group eight metals of the periodic table.

Still a further object of this invention is to provide an extreme pressure lubricant for drilling muds comprising an oil insoluble, water insoluble extreme pressure agent dispersed in water by means of a stabilizing agent, which increases the film strength of the interfacial adsorption layers and in which said agent is one of the lignosulfonates, a lignite, a bark extract, or a polyphenolic compound derived from bark extract.

Yet a further object of this invention is to provide an extreme pressure lubricant for drilling muds dispersed in water and in which the soap is a heavy metal salt of a fatty acid, including stearic acid, rosin acid, tall oil, cottonseed oil and the like.

Yet a further object of this invention is to provide an extreme pressure lubricant for use in drilling muds in which the extreme pressure formulation consists of a water insoluble heavy metal soap dispersed in water having a stabilizing agent added thereto, which increases the film strength of the boundary layers of the dispersed soap and the water, and in which the mud is an oil-in-water emulsion and in which the oil is prevented from wetting out on metal surfaces because of the multilayer adsorption films previously discussed.

Still a further object of this invention is to provide an extreme pressure lubricant, as mentioned above, which is effective in an aqueous medium having a calcium ion concentration in excess of 600 parts per million and at pH values between 7 and 10, these formulations being also effective in muds having brine concentrations of 15 to 35% sodium chloride and which may have 5 to 15% oil emulsified therein as oil-in-water emulsions.

It is still another object of this invention to provide an extreme pressure lubricant for drilling muds in which the extreme pressure lubricant can be made in liquid or powder form and added to existing drilling muds in a simple and expeditious process.

Other objects of this invention will appear in the detailed description which follows and will be further apparent to those skilled in the art.

In the design of drilling muds for use with E.P. lubricants it is especially desirable to have from four to ten percent concentration in the mud filtrate of an oil insoluble hydrophilic material such as the various lignosulfonates (known in petroleum production under the trademarks Kembreak, Q-Broxin, Polytrol, etc.) or lignites (known as Ligco, Carbonox, Tannathin) or various bark extracts and polyphenolic compositions (known as Rayflo, Milflo, Palcotan, etc.). This is desirable, because these agents are believed to promote the water wetting of metal and mineral surfaces and form interfacial membranes or "skins" at oil water interfaces, thereby acting to minimize or prevent the oil wetting of metal surfaces.

It will be noted below that the various organic lignosulfonates are used in the E.P. formulation as well as in the mud. When so used in the formulation a hydrophilic surface is provided for the dispersed E.P. agent which, for example, may be aluminum tristearate. The stearates used are not oil soluble and the lignosulfonate is used for the purpose of permitting the stearates to be readily dispersed into an aqueous phase of the driling mud. A concentration of about 10% of the lignosulfonate in the aqueous phase is preferred to facilitate multilayer adsorption of the lignosulfonate on the surface of the insoluble aluminum stearate.

The muds treated according to this invention may be desirably adjusted to a pH of 7.5 to 10.5 with sodium hydroxide. The presence of free sodium hydroxide should be kept low, generally less than 1½ pounds per barrel, because sodium hydroxide undesirably lowers the surface and interfacial tension of the above discussed hydrophilic materials in water and also acts to decrease the strength of interfacial films formed at oil-water interfaces by increasing the solubility of the organic components of the E.P. lubrication formulation in the water phase.

The laboratory evaluation of the properties of the E.P. additives in muds are at this time rather inconclusive inasmuch as the formation of the actual E.P. lubricant or "grease" seems to be the result of a chemical reaction initiated at the point of metal-to-metal or metal-to-mineral contact. Since the application of E.P. lubrication in water base drilling muds is a relatively new field and evaluation instrumentation is sparse, I have used a high pressure lubricant tester developed by the Baroid Division of National Lead Company known as the Baroid E.P. Tester as a laboratory and field testing device. This machine does not necessarily correlate with the Timken Lubricant Tester but it is of manageable size for use in the oil field and has proved of value in checking the lubricant properties of field muds. In this connection, the actual friction torque of the test machine as measured in amperes has proved of more value in field use than the designation of the word "pass," indicating successful running of the test block under 250 or 450 inch pounds for five minutes without seizure. I have found that with everything else remaining constant except the concentration or type of E.P. additive present in the mud, torque values may vary from 2.0 amperes to 8.0 amperes and still "pass." A "failure" characterized by metal-to-metal contact galling or seizure, of course, always runs the amperes off the scale on the high side.

A "pass" may actually be obtained in weighted muds in the absence of any E.P. agent, due simply to the mechanical effect of the barite, but in such case the friction will always be high.

The addition of a suitable E.P. additive to a drilling mud always results in a lowering of friction on a Baroid Tester or similar device. Because of the formation of the real E.P. lubricant occurs by chemical reaction during the actual drilling operation, laboratory evaluation of E.P. effect by various machines such as Timken Lubricant Tester is an imperfect manner by which to evaluate and predict from laboratory data how any given E.P. additive will perform under actual field conditions. With proper experimental techniques, correlation with other tests, and the proper interpretation of results, however, such machines may be used as an effective tool in the development of E.P. additive compositions.

To secure the advantages of E.P. lubrication in the inhibited high weight emulsion muds prevalent in the gulf coast area, a preferred E.P. formulation according to my invention would be prepared as follows:

Dissolve a calcium lignosulfonate in water in amounts sufficient to give a 10% concentration by weight. This may be varied from 5 to 25%. To this solution add sufficient lime to adjust the pH of the solution in the range 9.5 to 10. The use of lime has the effect of increasing the strength of the interfacial films formed by the lignosulfonate and assist in the wetting out of aluminum tristearate used as the E.P. additive. In addition, the higher calcium ion concentration of the aqueous phase assists materially in maintaining the insolubility in water of the aluminum tristearate E.P. agent. The aluminum tristearate is added to the solution in sufficient amount to give an additive concentration of 2 pounds per gallon, which corresponds to about 25% by weight. After a pre-dispersion stage the composition is passed through a suitable homogenizer or colloid mill to give a colloidal or near colloidal dispersion of the aluminum tristearate in the lignosulfonate solution. In this formulation, as in others also, the addition to the drilling mud is made in sufficient quantities to provide from about ¼ to 5 pounds of the E.P. agent per barrel of mud. A preferred range of the E.P. agent is from about ½ to 2 pounds per barrel.

If the concentration of the ingredients is increased until the lignosulfonate concentration in the water phase ranges from 15 to 30% by weight and the heavy metal soap ranges from ½ to equal that of the lignosulfonate, the E.P. formulations may be prepared as a spray dried powder. The higher percentages of the lignosulfonates provide stabilization for the dispersed phase in the spray drying operation. In this lignosulfonate solution of pH 7 to 10 the oil insoluble soaps may be generally used in a concentration of 5 to 50% of the total weight of the suspension. The spray drying may be done by taking the liquid formulation and running it through a conventional spray drier.

As an actual example a formulation to be spray dried consists of a water solution 100 parts by weight of water and 50 parts of the hydrophilic organic compound, such as a lignosulfonate, to which is added 25 parts of insoluble soap such as aluminum stearate. The mixture is dispersed and spray dried to a powder form. In such spray dried powders it is desirable that the E.P. soap be present as 25 to 50% by weight with the lignosulfonate present in amounts of about 50 to 75% and a small amount of residual water as 3 to 5%. The pressures and temperatures employed in the spray drying operation are variable depending upon the size and kind of spray driers employed as is well understood in the art, but in general the temperature of the spray dried powder should not exceed the softening range of the E.P. soaps.

As another example of an E.P. formulation made according to this invention, calcium soap dispersions may be made by first forming a dispersion of about 25% by weight of a sodium cottonseed oil soap in a water solution containing 6 to 10% of dissolved lignosulfonate. Calcium chloride or calcium hydroxide is added to this dispersion in sufficient amount to react with the sodium soap to form a calcium soap. Since the reaction takes place in the presence of the 6 to 10% solution of lignosulfonate, the calcium soaps are formed in a highly dispersed state and no agglomeration results. The calcium soaps in this formulation have been found to provide satisfactory extreme pressure lubricant effects. Other variations of this process may be practiced and, as examples, calcium tallate may be formulated similarly by first forming in a lignosulfonate solution a sodium tallate soap from tall oil and then reacting this with sufficient calcium chloride to effect the conversion of sodium tallate to calcium tallate. Like procedures may be employed with stearic acid, sodium cottonseed oil soap and other fatty acid soaps.

Tall oils or limed tall oils may be thinned with miscible fluids such as furfural or furfural alcohol, then emulsified in 5 to 10% lignosulfonate solutions, and then reacted with calcium, aluminum or lead chlorides or other soluble heavy metal compounds to give an insoluble heavy metal tallate. The melting point of these heavy metal tallates may be increased by incorporating in the reaction mixture resin acids such as abietic acid.

Other formulations may be prepared in accordance with the basic concepts previously described. Other long chain fatty acids may be reacted with lime in the presence of hydrophilic organic stabilizing agents, such as lignosulfonates, to give dispersions of insoluble soaps. The sodium soaps of fatty acids or tallates may be reacted with aluminum sulfate, calcium chloride or other soluble salts of alkaline earth or heavy metal elements to give insoluble precipitates with or without finely divided calcium carbonates, clays or other solids acting as nucleating agents.

It should be emphasized that although the E.P. additive formulations of my invention will function in fresh water, their efficacy in the inhibited muds characteristic of the gulf coast is dependent upon the properties of the mud in which they are used. The preferred muds for use of the E.P. additives according to my invention are the high organic low water loss inhibited muds.

The essentials of such muds are a sufficiently high concentration of oil insoluble hydrophilic organic polyelectrolytes such as the lignosulfonates in the aqueous phase to form tough interfacial films, and to provide a hydrophilic surface at metal-water or mineral-water interfaces. In general, this concentration amounts to 5% or more organic in the water phase. The water phase of the mud should also have in solution a sufficient concentration of inorganic electrolyte to insure insolubilization of the E.P. chemical reaction or by "salting-out." Properly prepared, oil-in-water emulsions in such muds according to this invention do not "wet-out" oil on the drill pipe or drill bit bearing surfaces and do not give an oil film that acts as a solvent or diluent for the actual lubricant E.P. lubricant "grease."

It is characteristic of muds properly prepared according to this invention that they have load carrying capacities as measured by the Baroid E.P. Tester of not less than 450 inch pounds (which is equivalent to 100 pounds Timken). Treatment of 2 pounds per barrel of aluminum tristearate prepared in accordance with the preferred E.P. formulation described will provide such load carrying capacities to (1) fresh water muds of not more than 10.5 pH (2) lime muds (3) saturated salt water muds (4) gypsum muds and (5) calcium chloride muds.

As an example of the efficiency and use of one of the preferred embodiments of my invention an oil well offshore of the coast of Louisiana in the Gulf of Mexico was conditioned with a high organic, high calcium, low water loss mud according to the principles set down in the disclosures pertinent to this invention. Technically, but superficially, this mud was known in the field as a "gyp-Q-Broxin mud." The E.P. formulation of aluminum tristearate prepared as discussed in the above disclosures was used to provide extra pressure lubrication to this mud primarily to minimize the so-called differentially sticking that was characteristic of the formations to be drilled in his well. The E.P. formulation was added at 11,600' to the extent of 1 pound per barrel. After twelve hours there was a noticeable reduction in torque on the drill stem. Before adding the E.P. additive torque on the drill stem was indicated by 174 amperes with a 25,000 pound weight on the bit. After the addition of 1 pound per barrel of the aluminum tristearate prepared according to this invention the weight on the bit was increased to 35,000 pounds but the torque on the drill stem decreased until only 75 amperes were required to drive the bit at the same speed of rotation.

With the extreme pressure lubricant present in the mud, the well was drilled through difficult formations that had stuck two previous attempts to penetrate it. The bore hole remained open and free. Electric logs were run exceptionally easily and casing was set at 13,088' with ease in the gage hole.

After setting the casing, drilling was continued to a depth of 16,108' in a completely wildcat area with no difficulties occurring. The total E.P. additive added in the sixty days required to drill from 11,600' to 16,108' was only 1¼ pounds per barrel. The effect of E.P. additives to combat differential sticking appeared to be justified in this well. In addition, in comparison with informaton gained in previous attempts to drill through these formations it was found that without the E.P. formulation of this invention, bit life with a 12½ inch bit averaged 12 to 18 hours. With the E.P. lubricant mud, according to this invention, bit life averaged 24 to 25 hours. Before the E.P. formulation was added bearing breakdown in the bit occurred before the teeth were worn out. After the addition of the E.P. formulation drilling could be continued until the teeth wore out and when the bit was pulled it was found that the bearings were still in excellent condition.

It was further noticed that the rate of penetration remained at a near constant rate or within 1 foot per hour until the bits wore out. This was described as being due to the effect of the E.P. lubricant present in the mud.

After the E.P. lubricant was established and until completion of drilling, the joints, drill collar and etc., all showed heavy coatings of the characteristic E.P. "grease" when the string was pulled.

Tests made on this mud showed a steady decrease in frictional resistance as time went on. Within one day after adding the E.P. formulation the frictional resistance was indicated by a 4.6 amp. reading with the Baroid E.P. tester at 250 inch pounds, and after a few days of drilling frictional torque decreased until a 3.2 ampere reading was obtained during testing.

The properties of this mud at 15,142' which are listed only for purpose of example were as follows:

| | |
|---|---:|
| Mud weight _____pound/gal.__ | 17.9 |
| Viscosity _____seconds, funnel__ | 61 |
| Centipoise _____ | 72 |
| Plastic vis. _____ | 64 |
| Yield point _____ | 16 |
| Zero gel _____ | 0 |
| Ten minute gel_____ | 6 |
| A.P.I. 30 min. filter loss_____cc__ | 0.8 |
| Oil content _____percent__ | 12 |
| Solids content _____do____ | 37 |
| NaCl _____ p.p.m.__ | 11,400 |
| Ca _____ p.p.m.__ | 1,200 |
| E.P. amps. _____ | 3.5 |

In addition, there has been a noticable increase in the life of pump parts such as liners, piston heads and piston rubbers on mud jobs in which my E.P. lubricant formulation has been used.

My invention has been tested under field conditions in a large number of wells in Texas, Louisiana and Mississippi. In each test the results have proved pleasing to the drilling contractor. Furthermore, in all of these field tests there has been as yet not one single complaint concerning the functioning of my invention or any adverse side effects.

Although the exact mechanism by which my invention is effective is not entirely known it is believed that the mechanism is as discussed above. However, my invention is not limited to any one theory of operation. Obvious changes and substitutions may be made in practicing my invention and still be within the scope thereof defined by the following claims.

What is claimed is:

1. An extreme pressure lubricant composition consisting essentially of 5 to 50% of a water insoluble metal soap dispersed in an aqueous phase containing 5 to 30% of a hydrophilic organic stabilizing agent, the metal of the metal soap being chosen from the group consisting of aluminum, the alkaline earth metals and the metals of group 4 and 8 of the periodic table, said agent consisting of at least one member of the group consisting of a lignosulfonate, a lignite, and a polyphenolic compound derived from bark extract, said composition having a pH of 7 to 10.

2. The extreme pressure lubricant composition of claim 1 in which the stabilizing agent is a lignosulfonate.

3. The extreme pressure lubricant composition of claim 1 in which the stabilizing agent is calcium lignosulfonate.

4. The extreme pressure lubricant composition of claim 1 in which the stabilizing agent is a lignite.

5. The extreme pressure lubricant composition of claim 1 in which the stabilizing agent is a polyphenolic compound derived from bark extract.

6. A composition of matter consisting essentially of an aqueous solution of 5 to 30% by weight of a stabilizing agent consisting of at least one member of the group consisting of lignosulfonate, polyphenolic compounds derived from bark extracts and lignite, and 5 to 50% of a water insoluble metal soap dispersed in said solution, said soap consisting of a metal salt of an organic acid having a carbon chain length of 5 to 29, said metal consisting of at least one member of the group consisting of the alkaline earth metals, aluminum, and the group four and group eight metals of the periodic table.

7. The composition of claim 6 in which the organic acid is one member of the group consisting of stearic acid, rosin acid and organic acids derived from coconut oil and tall oil.

8. The composition of claim 6 in which the stabilizing agent is calcium lignosulfonate and the water insoluble soap is aluminum tristearate.

9. The composition of claim 6 in which the stabilizing agent consists of lignosulfonate.

10. The composition of claim 6 in which the stabilizing agent consists of polyphenolic compounds derived from bark extracts.

11. The composition of claim 6 in which the stabilizing agent consists of lignite.

12. A drilling mud composition consisting essentially of clay solids and weighting agents in an aqueous phase, at least 5% of a stabilizing agent dissolved in the aqueous phase, said stabilizing agent consisting of at least one suitable member of the group consisting of lignosulfonate, polyphenolic compounds derived from bark extracts and lignite, and from ¼ to 5 pounds per barrel of mud of a water insoluble metal soap dispersed in the aqueous phase, said soap consisting of a metal salt of an organic acid having a carbon chain length of 5 to 29, said metal consisting of at least one member of the group consisting of the alkaline earth metals, aluminum and the group four and group eight metals of the periodic table.

13. The drilling mud composition of claim 12 in which the organic acid is one member of the group consisting of stearic acid, rosin acid and organic acids derived from coconut oil and tall oil.

14. The drilling mud composition of claim 12 in which the aqueous media has a brine concentration of 15 to 35% sodium chloride.

15. The drilling mud composition of claim 12 in which the pH is adjusted from about 7.5 to 10.5 with sodium hydroxide.

16. The drilling mud composition of claim 12 having about 5 to 15% of oil dispersed in the composition separately from the dispersed soap.

17. A drilling mud composition consisting essentially of clay solids dispersed in an aqueous phase, at least 5% of lignosulfonate in the aqueous phase, with from ½ to 2 pounds per barrel of aluminum tristearate dispersed in the aqueous phase, said aqueous phase having a calcium ion concentration of at least about 600 parts per million and a pH of about 7 to 10.

18. A drilling mud composition consisting essentially of clay solids dispersed in an aqueous phase, at least 5% of a stabilizing agent in the aqueous phase, with ½ to 2 pounds per barrel aluminum tristearate dispersed in an aqueous solution of 15 to 35% sodium chloride.

19. A drilling mud composition consisting essentially of clay solids and aluminum stearate dispersed in an aqueous phase, said aqueous phase having a brine concentration of 15 to 35% sodium chloride, a dispersed oil phase of about 10 to 15% of the total volume of the mud composition, and a lignosulfonate concentration of about 4 to 10% in the aqueous phase to aid in securing a stable oil emulsion.

20. The drilling mud composition of claim 19 in which the pH is adjusted from about 7.5 to 10.5 with sodium hydroxide.

21. A drilling mud composition consisting essentially of clay solids and aluminum stearate dispersed in an aqueous phase, said aluminum stearate being present in the amount of ½ to 2 pounds per barrel, about 4 to 10% of a stabilizing agent dissolved in the water phase consisting of at least one member of the group consisting of lignosulfonate, polyphenolic compounds derived from bark extracts and lignite, said composition having a pH of 7 to 10 adjusted by at least one member of the group consisting of lime hydrate and sodium hydroxide.

22. The drilling mud composition of claim 21 having about 10 to 15% diesel oil dispersed therein to assist in bringing the water loss to a 2 cc. value or less API.

23. The drilling mud composition of claim 21 in which the stabilizing agent is a lignosulfonate.

24. The drilling mud composition of claim 21 in which the stabilizing agent is a lignite.

25. The drilling mud composition of claim 21 in which the stabilizing agent is a polyphenolic compound derived from bark extract.

26. An extreme pressure lubricant composition in the form of a water dispersible powder, said composition consisting essentially of about 25 to 50% of a water insoluble metal soap the metal of the metal soap being chosen from the group consisting of aluminum, the alkaline earth metals and the metals of group 4 and 8 of the periodic table and about 50 to 75% of a hydrophilic organic stabilizing agent, said agent consisting of at least one member of the group consisting of a lignosulfonate, a lignite, and a polyphenolic compound derived from bark extract.

27. An extreme pressure lubricant composition in the form of a water dispersible powder, said composition consisting essentially of 25 to 50% of a water insoluble metal soap, said soap consisting of a metal salt of a fatty acid having a carbon chain length of 5 to 29, and said metal consisting of at least one member of the group consisting of the alkaline earth metals, aluminum and the group four and group eight metals of the periodic table, and 50 to 75% of a hydrophilic organic stabilizing agent said agent consisting of at least one member of the group consisting of a lignosulfonate, a lignite, and a polyphenolic compound derived from bark extract.

28. The extreme pressure lubricant composition of claim 27 in which the soap is aluminum stearate.

29. An extreme pressure lubricant composition in the form of a water dispersible powder, said composition consisting essentially of 25 to 50% of a water insoluble metal soap the metal of the metal soap being chosen from the group consisting of aluminum, the alkaline earth metals and the metals of group 4 and 8 of the periodic table and 50 to 75% of a hydrophilic organic stabilizing agent, said agent consisting of at least one member of the group consisting of a lignosulfonate, a lignite, and a polyphenolic compound derived from bark extract.

30. The extreme pressure lubricant composition of claim 29 in which the stabilizing agent is calcium lignosulfonate.

31. The extreme pressure lubricant composition of claim 29 in which the soap is aluminum stearate and the stabilizing agent is calcium lignosulfonate.

32. An extreme pressure lubricant composition in the form of a water dispersible powder, said composition consisting essentially of 25 to 50% of a water insoluble metal soap, said soap consisting of a metal salt of a fatty acid having a carbon chain length of 5 to 29, and said metal consists of at least one member of the group consisting of the alkaline earth metals, aluminum and the group four and group eight metals of the periodic table, and 50 to 75% of a hydrophilic organic stabilizing agent, said agent consisting of at least one member of the group consisting of a lignosulfonate, a lignite, and a polyphenolic compound derived from bark extract.

References Cited in the file of this patent

UNITED STATES PATENTS

| | | |
|---|---|---|
| 1,758,446 | Koethen | May 13, 1930 |
| 1,942,636 | Bennett et al. | Jan. 9, 1934 |
| 2,413,220 | Elder et al. | Dec. 24, 1946 |
| 2,468,658 | Dyke | Apr. 26, 1949 |
| 2,702,787 | Freeland | Feb. 22, 1955 |
| 2,773,030 | Tailleur | Dec. 4, 1956 |
| 2,782,241 | Gray et al. | Feb. 19, 1957 |
| 2,783,122 | Hoekje | Feb. 26, 1957 |
| 2,800,449 | Browning | July 23, 1957 |
| 2,805,991 | Tailleur | Sept. 10, 1957 |

FOREIGN PATENTS

| | | |
|---|---|---|
| 559,850 | Great Britain | Mar. 8, 1944 |
| 803,544 | Great Britain | Oct. 29, 1958 |